Patented Sept. 26, 1944

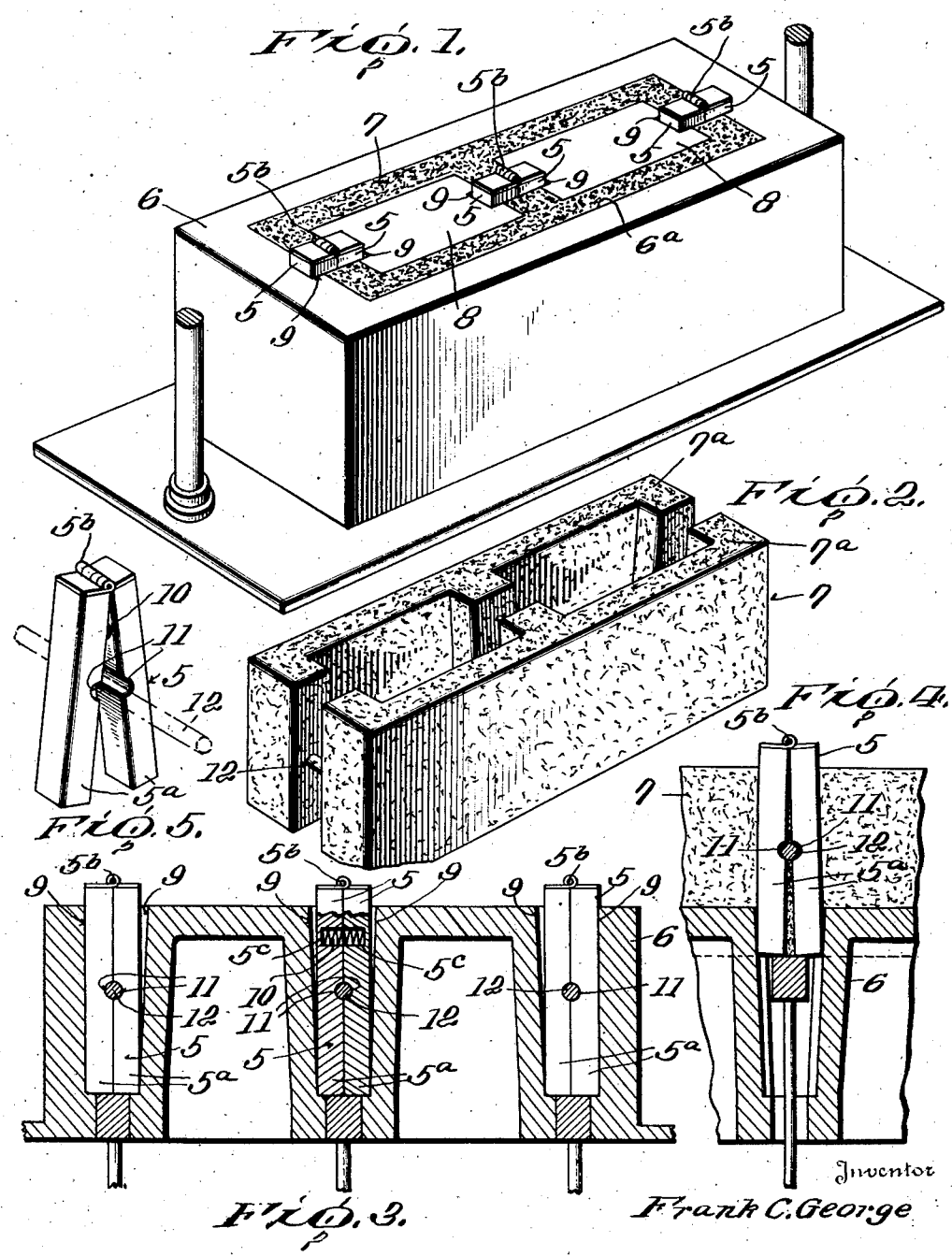

2,359,214

UNITED STATES PATENT OFFICE 2,359,214

MOLD CORE ELEMENT

Frank C. George, Orlando, Fla.

Application February 3, 1943, Serial No. 474,593

7 Claims. (Cl. 25—128)

My invention relates to improvements in molding apparatus and especially to a novel die or core element which although useful for other purposes is particularly adapted for use in conjunction with a block mold, or the like, for making building block, tile, etc.

Briefly and generally stated, the invention has for one of its primary objects to provide a die or core element which may be readily placed in, or removed from, operative position in a mold by hand or by mechanical means.

Another object is to furnish a die or core element for the purpose specified which is adapted to serve as means for initially holding and positioning a tie rod or other element which it is desired to embed or partially embed in the object to be molded.

A further object of the invention is to furnish a removable die or core element for use in the making of spaced walled building block, tile, etc., and which has means for initially positioning and releasably holding tie rods for connecting the spaced walls of the finished block or the like.

An additional object of the invention is to provide die or core elements which provide means adapted to be gripped to at least start the removal of the finished block from the mold.

A still further object is to provide a removable core element comprising preferably swingably connected sections cooperating to provide a seat for a rod or other object to be molded into a block or the like, there preferably being spring, or other means tending to separate said sections to release said seated rod or other object.

Other objects and advantages of my novel core element will be fully understood and appreciated by those skilled in the art upon reference to the following detailed description of the now preferred embodiment of the invention which is illustrated in the accompanying drawing.

In the drawing, wherein the same reference characters have been used to designate the same parts in all views, Figure 1 is a perspective view illustrating the use of my core element in conjunction with a block mold for producing a building block comprising spaced wall sections, connected by tie rods which are initially held and positioned by the core elements.

Figure 2 is a perspective view of a spaced walled block produced through use of my core elements;

Figure 3 is a central vertical longitudinal sectional view through the mold of Fig. 1, one of the core elements being shown broken and in section;

Figure 4 is a fragmentary longitudinal sectional view showing the block partially removed from the mold and one of the core elements about to release from a tie rod; and Figure 5 is a perspective view of one of the core elements.

Referring to the drawing by reference characters, and by way of illustration of one application of my novel die or core elements 5, I have illustrated a block mold 6 which is used in conjunction with said die or core elements 5 to produce the spaced walled building block 7.

As shown, the mold 6 is rectangular and has, projecting into its recess 6a, the two spaced and aligned frusto-pyramidal bosses 8. As shown, mold 6 has the upwardly operable plunger-like block-supporting bottom.

The downwardly and outwardly sloping sides of bosses 8 which oppose walls of mold 6 are spaced therefrom as are the two walls of bosses 8 which are in opposition. By preference the opposed boss walls and opposed boss and mold walls have registering die-receiving seats 9 extending the full depth of the bosses 8 and the back wall of at least one seat 9 of each pair slopes outwardly toward the bottom of mold 6 in general conformity to the outward slope of the side walls of bosses 8. It will be understood later on that the grooves or seats 9 for dies 5, while desirable, are not necessary.

Coming now to my novel die 5, it will be seen to comprise the duplicate rectangular sections 5a hinged together as at 5b at one end and provided with opposed inner surface bores 5c for receiving the compression spring 10 which tends to separate die sections 5a.

At a point between spring 10 and their free ends, the die sections 5a have the registering transverse inner surface tie-rod engaging recesses 11 for receiving a tie rod 12 for connecting opposed portions of the walls 7a, 7a of the finished molded building block 7.

The operation of my novel die or core elements 5, in conjunction with mold 6, to produce block 7 with its spaced walls 7a, 7a connected by the rods 12, may be summarized as follows:

First, tie rods 12 are engaged in seats 11 and the die sections held closed by hand or otherwise against the action of spring 11 until inserted in place in the die receiving grooves 9. Then the back walls of said grooves 9 prevent die sections 5a from opening to release the tie rods 12 from recesses 11. The concrete or other plastic is now poured into the mold 6 and the letter agitated if desired.

When the block 7 has set sufficiently the plunger-like bottom of mold 6 is actuated upwardly to force the block 7 with the dies or core elements 5 out of the mold as shown in Fig. 4.

If mold 6 does not have the plunger-like block-supporting bottom, it can simply be inverted and lifted from block 7. Also, without inverting the mold the block 7 can be partially lifted from the mold by manual or mechanically operated means engaged with the projecting upper ends of the core, or die elements 5. Then, when elements 5 have released from tie rods 12 the blocks can be lifted out by hand.

The mold grooves or seats 9 for die or core elements 5 are advantageous in that they facilitate accurate positioning of the dies 5 and true vertica-movement removal of same, but it will be clear that die seats may be dispensed with.

The sloping of the walls of bosses 8 outwardly toward the bottom of mold 6 (and the back walls of die seats 9, if used) facilitate removal of the die, or core elements 5 and the finished block 7.

Having thus described my invention, what I claim as new is:

1. A core member for a mold, comprising at least two substantially identical sections, means hingedly connecting said sections together adjacent one end, and separate spring means spaced from said hinge end of the sections and normally urging said sections apart.

2. A core member for a mold, comprising at least two substantially identical sections, means hingedly connecting said sections together adjacent one end, and complementary tie rod gripping means on opposed sections between the ends of same.

3. A core member for a mold, comprising at least two substantially identical sections, means hingedly connecting said sections together adjacent one end, and complementary tie rod gripping recesses formed in opposed faces of said sections between said spring means and the free ends of said sections.

4. A core member for a mold comprising a pair of sections, hinge means connecting said sections adjacent one end, cooperating article-engaging means on opposed faces of said sections, and spring means carried by said sections between said hinge means and article-engaging means for normally tending to release an object from said cooperating article-holding means.

5. The combination set forth in claim 4, and said spring means comprising a coil spring, and said sections having opposed recesses receiving the ends of the spring.

6. In combination with a block mold for producing a spaced walled block, a removable tie rod-supporting core member positionable to initially support block section-connecting tie rods preparatory to and during the pouring of the block material, and ends of said core member extending beyond the mold whereby to provide hold means adapted to be engaged to at least partially remove the block from the mold after it has set, and the core member comprising separable sections hinged together at said projecting end.

7. The combinations set forth in claim 6, and means seated in said sections normally tending to separate the same.

FRANK C. GEORGE.